United States Patent
Ben-Arie et al.

[11] Patent Number: 5,946,039
[45] Date of Patent: Aug. 31, 1999

[54] METHOD AND SYSTEM FOR ENCODING

[75] Inventors: Yaron Ben-Arie, Ramat-Gan; Effi Orian, Pardessia; Itzhak Barak, Tel Aviv; Jacob Kirschenbaum, Hadera; Yehuda Shvager, Hashmonaim, all of Israel; Shao-Wei Pan, Lake Zurich, Ill.

[73] Assignee: Motorola, Inc., Schaumburg, Ill.

[21] Appl. No.: 08/911,901

[22] Filed: Aug. 15, 1997

[51] Int. Cl.[6] .................................................. H04N 7/30
[52] U.S. Cl. ...................... 348/403; 348/405; 364/725.03
[58] Field of Search .................................... 348/403, 405; 364/725.03; H04N 7/30

[56] References Cited

U.S. PATENT DOCUMENTS 5,764,533  6/1998  Hong ........................................ 348/407

OTHER PUBLICATIONS

G. K. Wallace, "The JPEG still picture compression standard", IEEE Transactions on Consumer Electronics, vol. 38, No. 1, Feb. 1992, pp. XVIII–XXXIV.

P. Pirsch, W. Gehrke, "VLSI Architectures for video signal processing", Image Processing and its applications, 4–6, Jul. 1995, Conference Publication No. 410, IEE 1995, pp. 6–10.

*Primary Examiner*—Howard Britton
*Attorney, Agent, or Firm*—James E. Gauger; Robert M. Handy

[57] ABSTRACT

An encoding system (400) receives samples and coefficients from a bus (422). The system comprises a plurality of parallel operating memory devices (430-k), registers (435-k), computing units (440-k), and accumulator units (460-k). The system (400) further comprises a parallel-to-serial buffer (470) coupled to the accumulator units (440-k) and a pair generator (480) for providing amplitude/index pairs. The system (400) performs encoding steps such as transforming, quantizing, zigzagging, rate controlling, and run-length coding. Transforming is explained for the example of a Forward Discrete Cosine Transformation (FDCT). According to a method (500) of the present invention, zigzagging (510) occurs prior to transforming (570) and performed only once when transformation coefficients are provided to the memory devices (430-k) in a zigzag arrangement. Quantizing occurs prior to transforming by pre-calculating the coefficients with quantizers. Pair generator (480) performes rate-controlling and run-length encoding (550). (with reference to FIGS. 2 and 9)

22 Claims, 11 Drawing Sheets

METHOD AND SYSTEM FOR ENCODING

RELATED INVENTION

The present invention is related to the following invention which is assigned to the same assignee as the present invention: [1] "Method and System for Performing a Convolutional Operation", having Ser. No. 08/535,800 filed on Sep. 28, 1995. The subject matter of the above-identified related invention is hereby incorporated by reference into the disclosure of this invention.

FIELD OF THE INVENTION

The present invention relates generally to digital signal processing and, in particular, to a method and a system for signal encoding on a parallel architecture.

BACKGROUND OF THE INVENTION

Computer processors are well known and widely used for a variety of purposes. One application of computer processors is digital signal processing (DSP). By definition, digital signal processing is concerned with the representation of signals by sequences of numbers or symbols and the processing of these signals. DSP has a wide variety of applications and its importance is evident in such fields as pattern recognition, radio communication, telecommunications, radar, biomedical engineering, and many others. With the introduction of digital television, the encoding and decoding of video data gains more and more importance. To save bandwidth, video signals are compressed by removing redundancies. Video compression standards are for example, JPEG, MPEG1 and MPEG2. Data compressing methods are, for example, explained in: Wallace, Gregory K.: The JPEG Still Picture Compression Standard, IEEE Transactions on Consumer Electronics, Vol. 38, No. 1, February, 1992 [2].

As used herein in singular and plural, the term "sample" represents input data, the term "amplitude" represents output data, and the terms "coefficient", "quantizer" and "intermediate result" represents any additional data needed to go from input data to output data.

Figure 1:
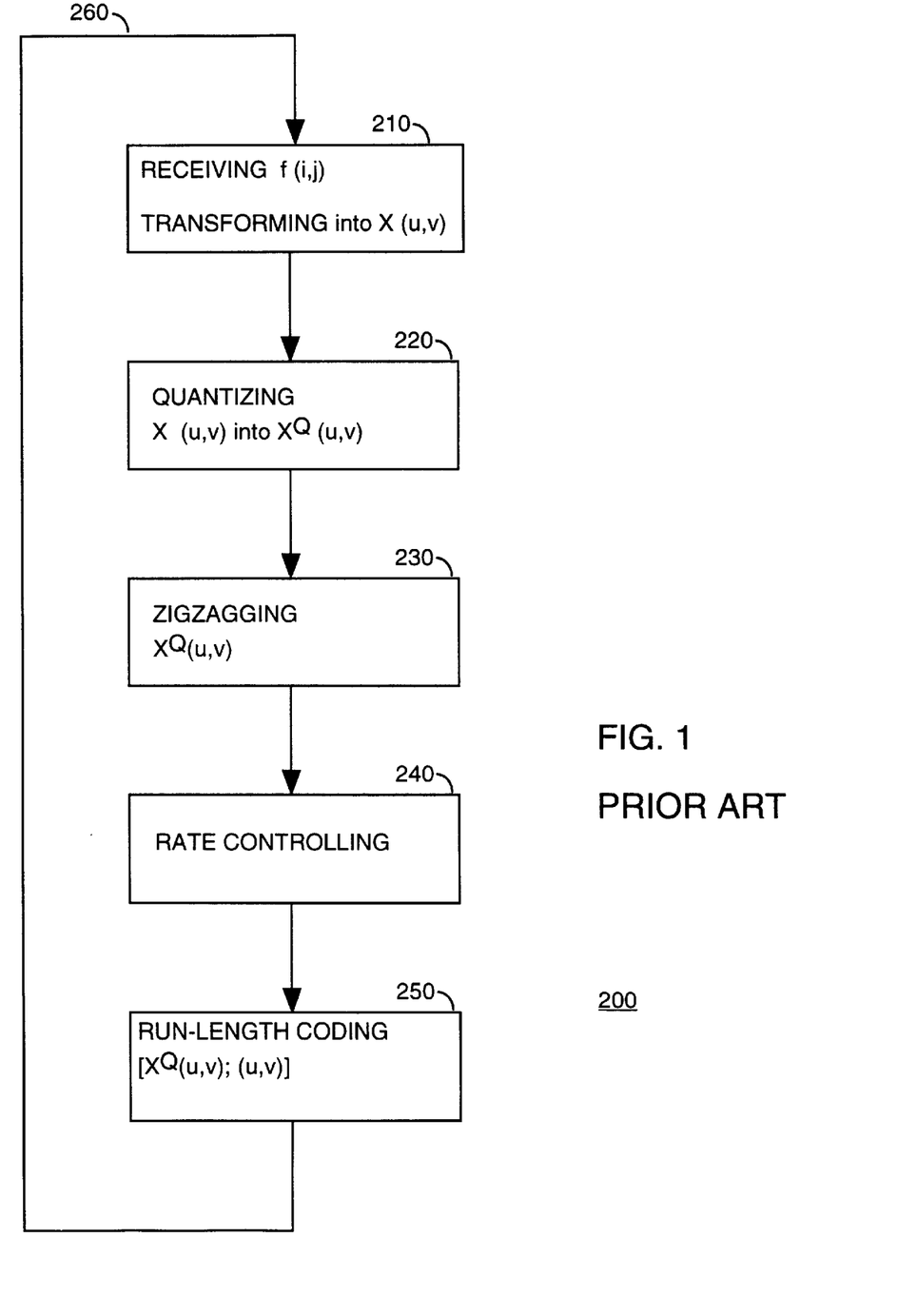
FIG. 1 illustrates a simplified flow chart diagram of a data encoding method according to the prior art.

FIG. 1 illustrates a simplified flow chart diagram of data encoding method 200 according to the prior art. Method 200 is explained in further detail in reference [2]. For convenience of further explanation, keywords are underscored. In transforming step 210, image samples f(i,j) in an image domain are received and transformed by e.g., Forward Discrete Cosine Transformation (FDCT) into amplitudes X(u,v) in a spectral or frequency domain. In quantizing step 220, quantized amplitudes $X^Q(u,v)$ are obtained by dividing amplitudes X(u,v) by quantizers Q(u,v). In zigzagging step 230, quantized amplitudes $X^Q(u,v)$ are re-arranged according to a zigzag path of a predetermined (u,v)-order. In rate controlling step 240, quantized amplitudes $X^Q(u,v)$ having a value of zero are detected. In run-length encoding step 250, pairs [$X^Q(u,v)$;(u,v)] of non-zero amplitudes $X^Q(u,v)$ and indices (u,v) are provided as output data. The steps are repeated upon receiving new image samples (line 260).

The present invention seeks to provide an improved method and system for signal encoding which mitigates or avoids well known disadvantages and limitations of the prior art.

DETAILED DESCRIPTION OF A PREFERRED EMBODIMENT

By system and method for video encoding of the present invention, image samples are transformed to amplitudes by cyclically processing the samples in parallel operating processors. Each processor is transforming image samples to amplitudes by cyclically multiplying transformation coefficients with the samples. Compared to prior art, in the present invention, zigzagging can be carried out prior to or simultaneously with transforming and performed only once when the transformation coefficients are provided to the processors in a zigzag arrangement. Similarly, quantizing can also be performed prior to or during transforming by pre-calculating the coefficients with Q(u,v). Rate-controlling and run-length encoding is independent from transforming and zigzagging so that overall calculation time is reduced.

Encoding is explained for the example of a Forward Discrete Cosine Transformation (FDCT) having a cosine function as an orthogonal base function (transformation function). The present invention uses precalculated transformation coefficients. A person of skill in the art is able, based on the description herein, to use the present invention also for other base functions (such as e.g., rectangular functions), without departing from the scope of the present invention.

Figure 2:
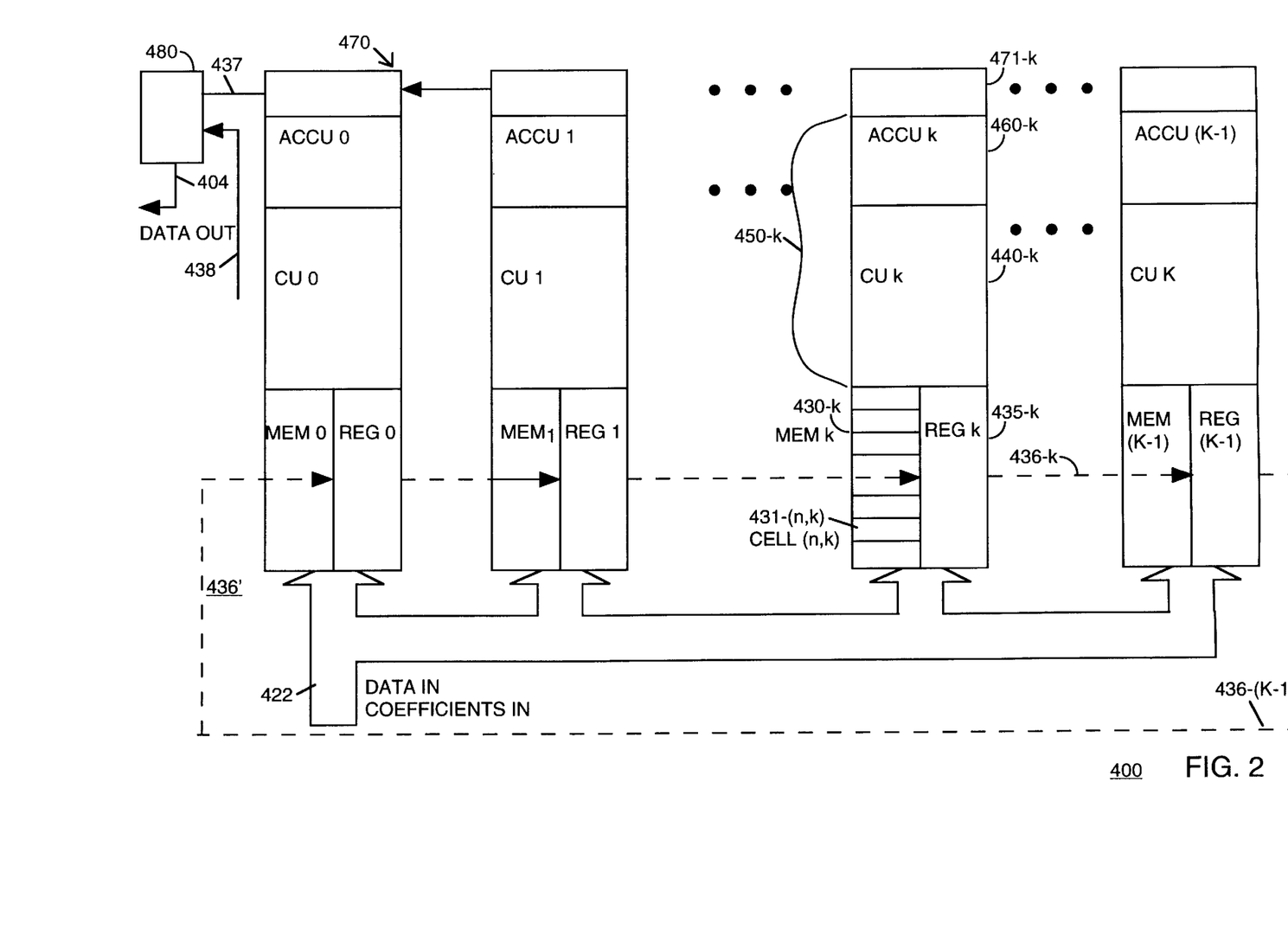
FIG. 2 illustrates a system in a preferred embodiment of a computer processor according to the present invention.

FIG. 2 illustrates system 400 in a preferred embodiment of a computer processor according to the present invention. In pluralities of k=0 to K−1, system 400 comprises memory devices 430-k (hereinafter MEM k) each having N memory cells 431-(n, k) (hereinafter CELL (n, k)), registers 435-k (hereinafter REG k), computing units 440-k (hereinafter CU k or "processing units"), and accumulator units 460-k (hereinafter ACCU k). System 400 also comprises parallel-to-serial buffer 470 (hereinafter buffer 470) having stages 471-k, and pair generator 480. System 400 receives image samples f (n) ("DATA IN") and optionally a coefficient matrix ("COEFFICIENTS IN") on input bus 422 and provides output data as non-zero pairs [$X^Q(k)$;p] on output line 404 ("DATA OUT") of pair generator 480. Conveniently, but not necessarily, pair generator 480 receives a threshold value at input 438. Preferably, input bus 422 is coupled to each REG k and MEM k (k=0 to K−1). Preferably, each MEM k is coupled to a corresponding CU k, and each CU k is coupled to a corresponding ACCU k. Each ACCU-k is coupled to stage 471-k of buffer 470. Buffer 470 is coupled to pair generator 480 via line 437. Optional lines 436-k (dashed) couple REG k to REG k+1 and optional line 436-(K−1) couples REG (K−1) to REG 0. REG 0 to REG (K−1) form thereby register ring 436'. This feature which is not essential for the present invention is used in a further method described in connection with FIGS. 10–11. CU k and ACCU k are collectively referred to as calculator 450-k.

Correspondences between elements of FIG. 2 to FIG. 1 of related invention [1] (Ser. No. 08/535,800) are: bus 422, MEM k, REG k, to a part of data pipeline 22; CU k to processing elements 26a–d; and ACCU k (k=0 to K−1) to accumulator 30. A person of skill in the art is able to use input log converter 20 and inverse-log converter 28 of the related invention. As known in the art, a multiplication operation of factors to a product can be implemented by adding logarithmic representation of the factors (e.g., obtained in converter 20) to an intermediate sum and obtaining the product by inverse logarithmic operation (e.g., in converter 28). Since the use of logarithmic operations is not essential for the present invention, this is not further considered for simplicity of explanation.

The architecture of CU k, MEM k, and REG k (k=0 to K−1) are, preferably, based on the architecture disclosed in above identified related invention [1]. Each MEM k can store, preferably, N (e.g., N=64) real numbers in its N CELL (n,k). The plurality of MEM k (k=0 to K−1) can be considered as a memory array {CELL} having K columns and N rows for storing a N*K coefficient matrix. The plurality of REG k (k=0 to K−1) can be considered as a register array {REG} for storing a vector image samples f (n). Arrays {CELL } and {REG } are, preferably, implemented by volatile memory devices, such as random access memory devices (RAM) well known in the art. It is possible to implement {CELL} also by a non-volatile device, such as, for example, a read only memory device (ROM).

System 400 performs transforming (cf. step 210), zigzagging (cf. step 220), and quantizing (cf. step 230) steps in its MEM k, CU k, REG k, and ACCU k. A quantized coefficient matrix $\{C^Q(n,k)\}^Z$ stored in the memory array {CELL} in a zigzag order is cyclically multiplied with image samples f(n) (n=0 to N−1) temporarily stored in the register array {REG}. Intermediate results are summed up for n=0 to N−1 to a vector $\{X^Q(k)\}$ of (K−1) quantized amplitudes $X^Q(k)$ which becomes available at ACCU 0 to ACCU (K−1). System 400 performs rate-controlling (cf. step 240) and run-length coding (cf. step 250) steps using buffer 470 and pair generator 480.

Figure 6:
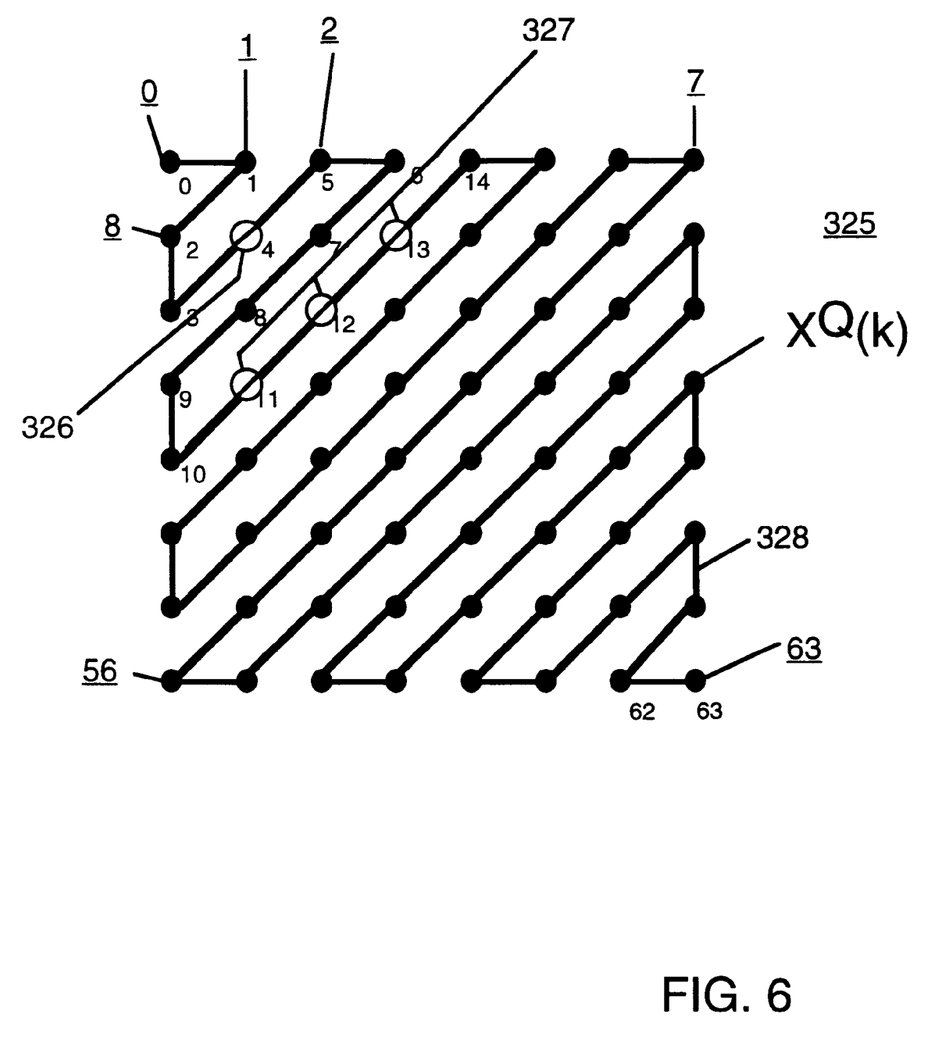
FIG. 6 illustrates a simplified block diagram of a quantized spectral block of quantized amplitudes.
Figure 7:
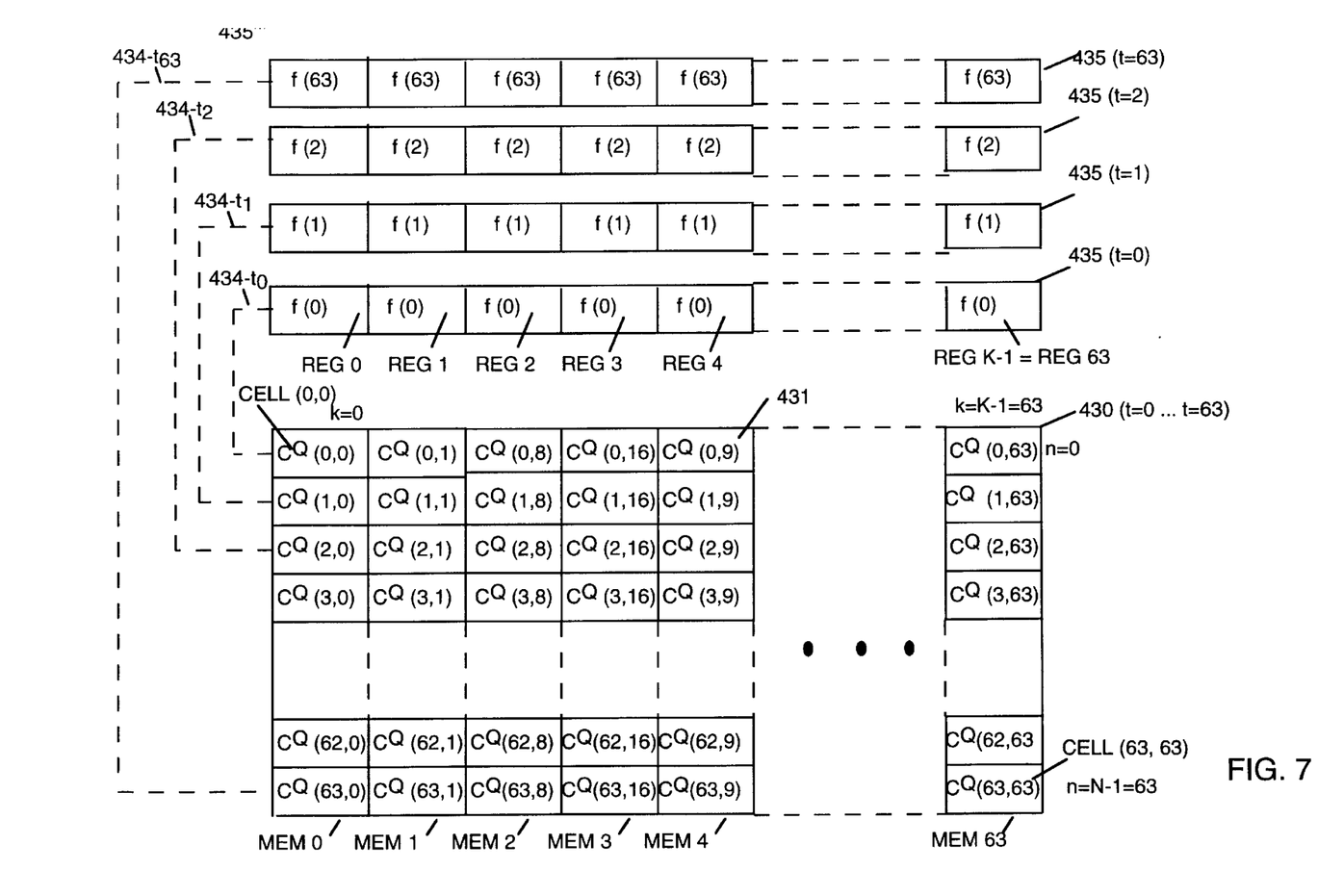
FIG. 7 illustrates example time-slices for a memory array and a register array of the system of FIG. 2.
Figure 8:
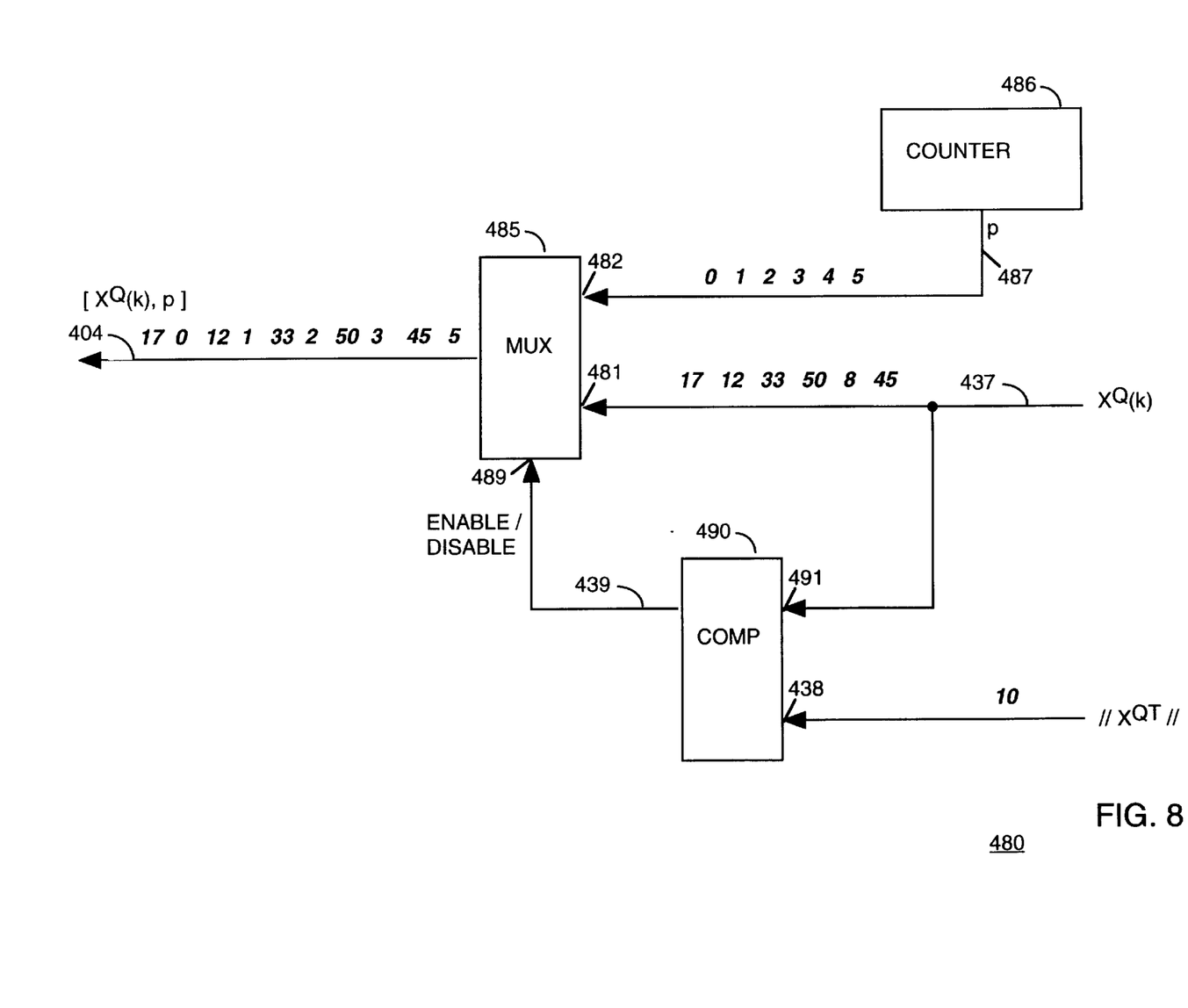
FIG. 8 illustrates a simplified block diagram of a pair generator as it can be used in the system of FIG. 2.
Figure 9:
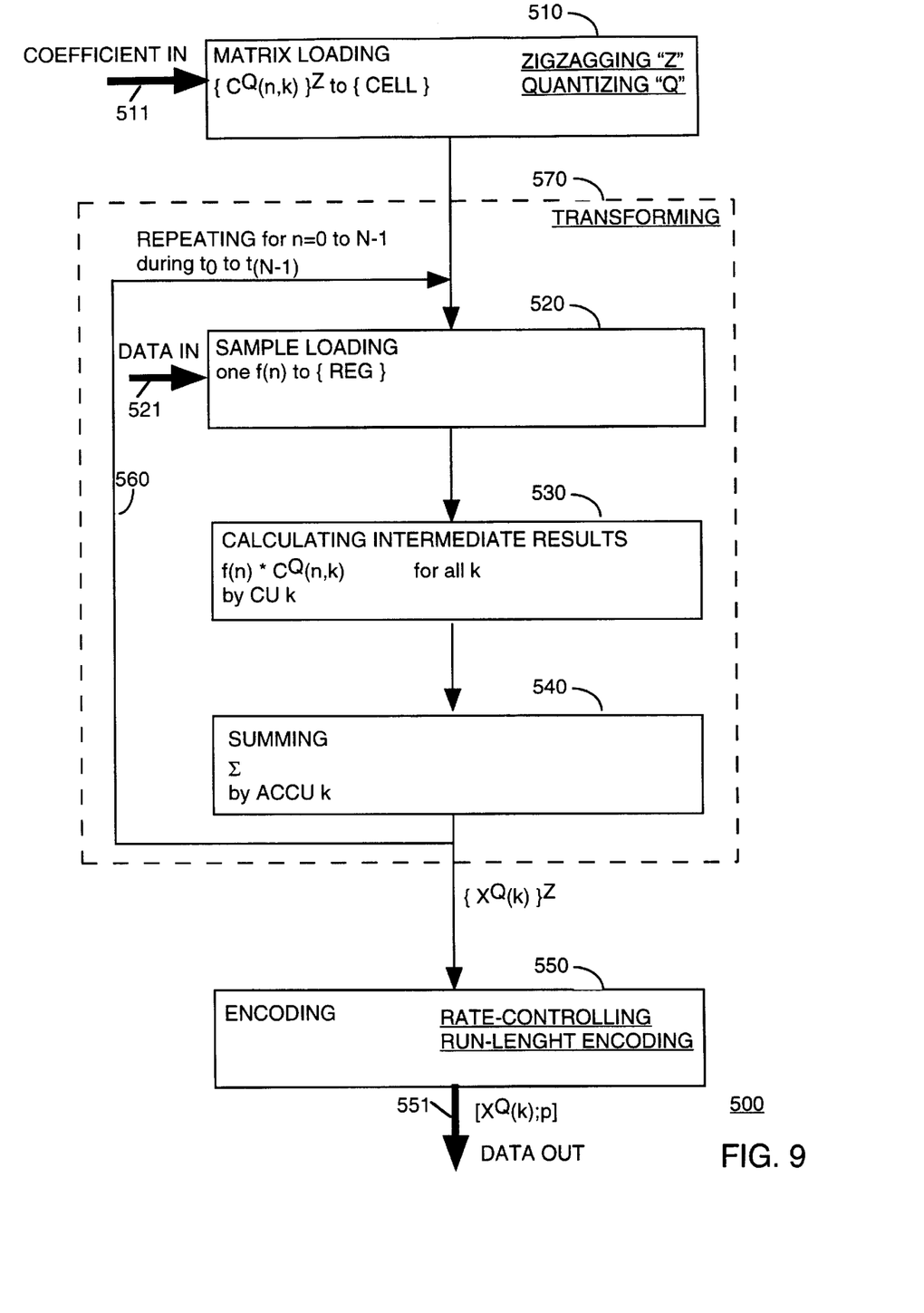
FIG. 9 illustrates a simplified flow diagram of a preferred method according to the present invention.
Figure 10:
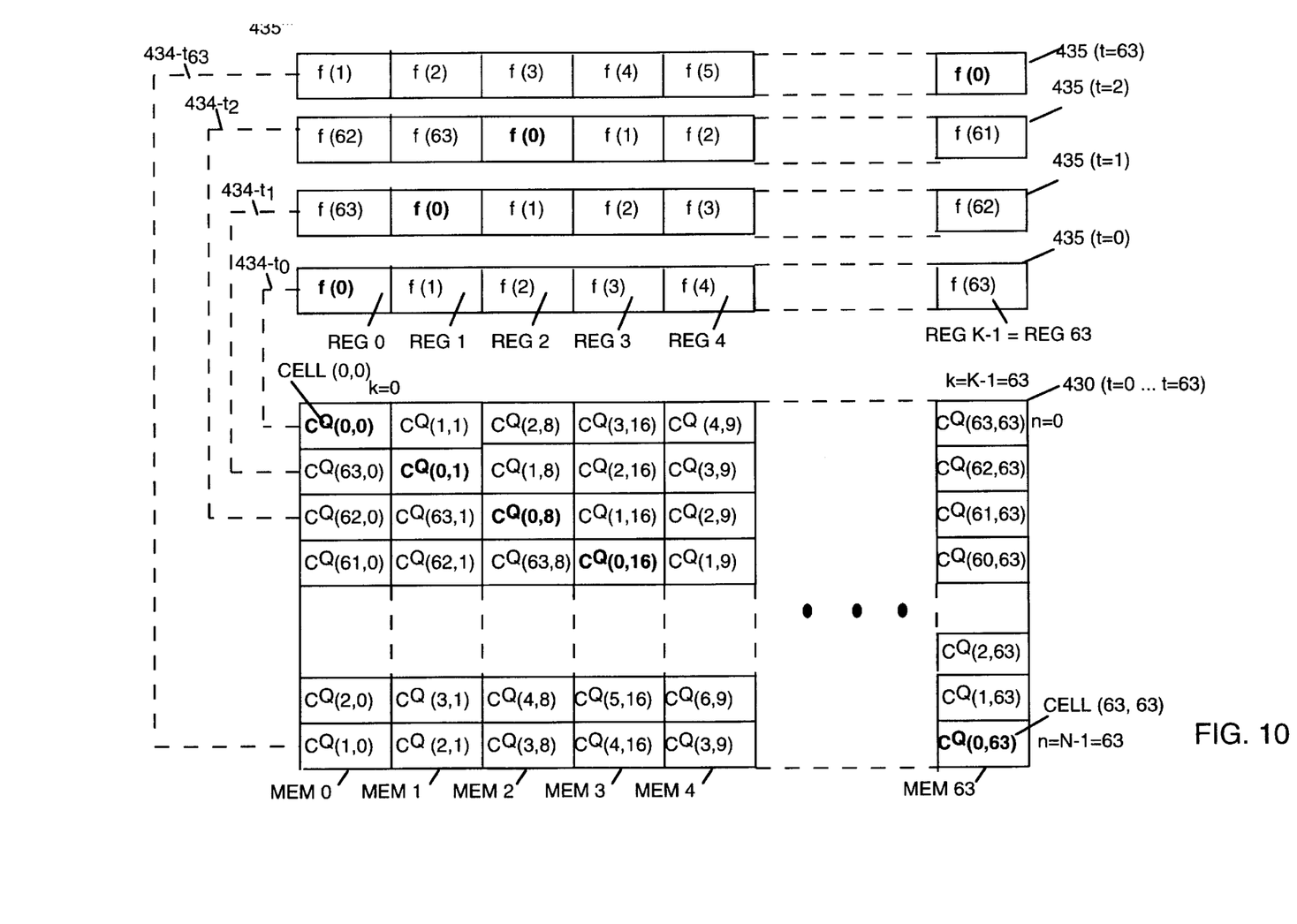
FIG. 10 illustrates further example time-slices for a memory array and a register array of the system of FIG. 2.

Transforming, zigzagging, and quantizing are explained in connection with FIGS. 3–7 and 10 wherein FIGS. 7 and 10 illustrate time-slices of {CELL} and {REG} in examples. Rate-controlling and run-length coding are explained in connection with FIGS. 6 and 8, wherein FIG. 8 gives details for pair generator 480. Method 500 of the present invention which shows how all steps are combined is explained in connection with FIG. 9. Further method 600 is explained in connection with FIGS. 10–11.

It is useful for the convenience of understanding to introduce video encoding with abbreviations and terms which describe the present invention. Data can have paired indices such as e.g., (i,j) and (u,v) and single indices such as e.g., n, k, and p. The *symbol represents multiplication and the slash / represents division. A set of e.g., K elements (e.g., samples, coefficients, amplitudes) such as, for example, α, β, γ and δ(K=4) can be illustrated as a vector {V} with elements v (k):

$$\{V\} = \{v(k)\} = |\alpha, \beta, \gamma, \delta| \tag{1}$$

$$= |v(0), v(1), v(2), v(3)| \tag{2}$$

wherein the elements {v(k)} of vector {V} have a single vector index, such as k=0 to (K−1). The graphical symbols are provided for convenience and serve only as a frame. The same set α, β, γ, and δ can also be represented as a matrix {M} with elements {μ(i,j)}:

$$\{M\} = \{\mu(i,j)\} = \begin{vmatrix} \alpha & \beta \\ \gamma & \delta \end{vmatrix} \tag{3}$$

$$\{M\} = \{\mu(i,j)\} = \begin{vmatrix} \mu(0,0) & \mu(0,1) \\ \mu(1,0) & \mu(1,1) \end{vmatrix} \tag{4}$$

wherein the elements {μ(i,j)} of matrix {M} have index pairs, such as (i,j). For convenience, indices are written in the order (row index, column index). In the example of equations (3) and (4), the matrix {M} has I=2 rows (or "row vectors" |αβ| and |γδ| and J=2 columns (or "column vectors" |αγ| and |βδ|). The terms "row" and "column" (singular or plural) are convenient abbreviations indicating first and second arrangement directions in the matrix, respectively. The sense in which vector and matrix indices change is not essential for the invention. For convenience, column indices in matrices (e.g., j) and vector indices (e.g., k) increase from the left to the right. Row indices increase in top down direction. A person of skill in the art is able to practice the present invention using matrices with different indices. For example, it is well know in the art to "transpose" any matrix without changing the information represented by its elements. Vector and matrix representations are equivalent and can be converted to each other. For example, in vector {V} and matrix {M} the elements follows the index order k=(i,j) with $$0=(0,0), \; 1=(0,1), \; 2=(1,0) \text{ and } 3=(1,1) \tag{5}$$

This convention is convenient. However, it is sometimes required to re-arrange the elements of a vector {V} or of a matrix {M}. For example, matrix {M} can be converted into a vector $\{V\}^Z$ in which elements β and γ are replaced. The superscript "Z" stands for "zigzag". For convenience, the replacement or re-arrangement of vector elements in a predetermined order is illustrated with the help of a permutation matrix {P}. Vector $\{V\}^Z$ is the matrix product of vector {V} (equation 1) with a permutation matrix {P}:

$$\{V\}*\{P\}=\{V\}^Z \tag{6}$$

where $$\{P\} = \begin{vmatrix} 0 & 1 & 2 & 3 \\ 1 & 0 & 0 & 0_0 \\ 0 & 0 & 1 & 0_1 \\ 0 & 1 & 0 & 0_2 \\ 0 & 0 & 0 & 1_3 \end{vmatrix} \begin{array}{l} \text{columns } l_2 \\ \\ \\ \\ \text{rows } l_1 \end{array} \tag{7a}$$

and $$\{V\}=|\alpha, \beta, \gamma, \delta| \tag{7b}$$

giving the result:

$$\{V\}^Z=|\alpha, \gamma, \beta, \delta| \tag{8a}$$

$\{V\}^Z = |v(0), v(2), v(1), v(3)|$ (8b)

Permutation matrix {P} has "0" and "1" elements p ($1_1$, $1_2$) arranged in $L_1$ rows and $L_2$ columns. Preferably, $L_1=L_2=K$. For convenience, row indices $1_1$ and column indices $1_2$ are given as small printed digits in equation (7). In {P}, every row has only a single "1" element and ($L_2$- 1) "0" elements, also every column has only a single "1" element and ($L_1$-1) "0" elements. The row index $1_1$ of the "1" element within column $1_2$ indicates which element v(k) of {V} becomes which element v(k) of $\{V\}^Z$. Every element of {V} is multiplied with a "1" element of {P} only one time. The k-indices in $\{V\}^Z$ are the same as the k-indices in {V}, only their order has changed from 0,1,2,3 to 0,2,1,3. This is a convenient definition. For example, as it will be explained later, FIG. 7 shows a memory array {CELL} with coefficients $C^Q(n,k)$ having indices k re-arranged to positions given by a permutation matrix {P}.

Figure 3:
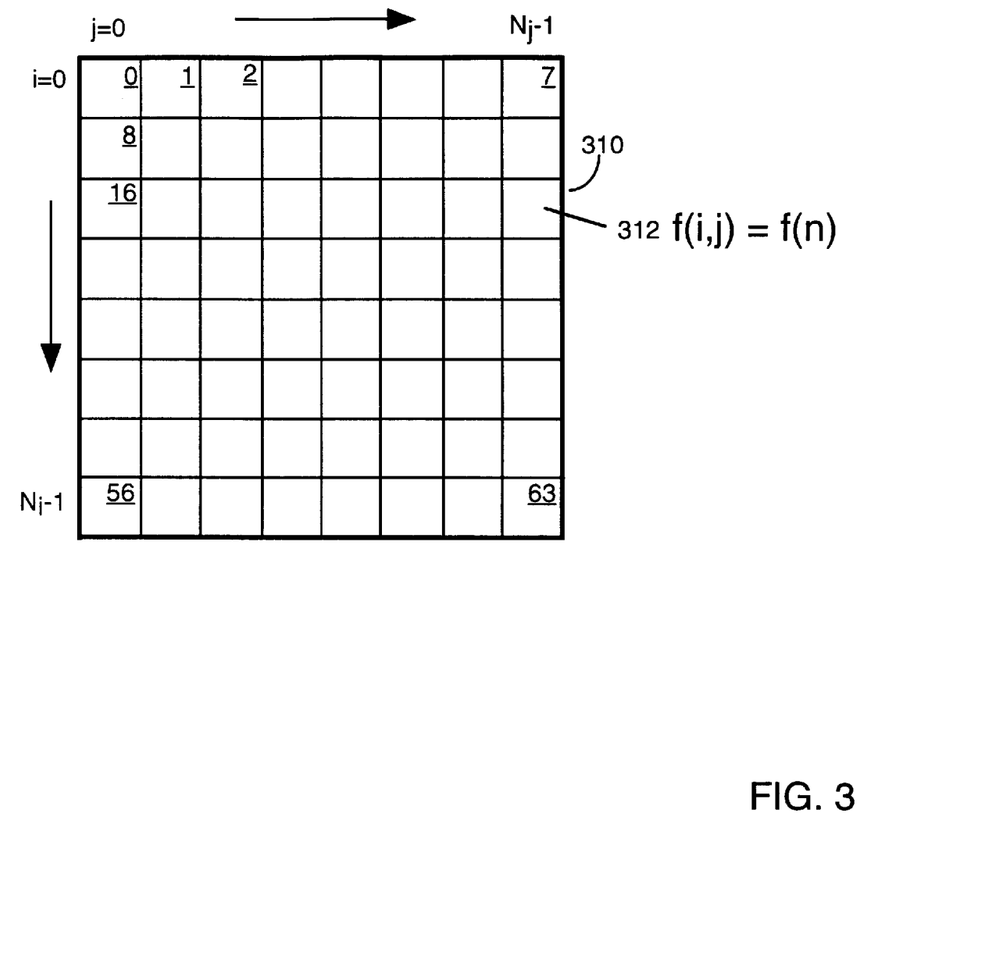
FIG. 3 illustrates a simplified block diagram of an image block.

Transforming (image to spectral domain) is explained in connection with FIGS. 3–4. FIG. 3 illustrates a simplified block diagram of image block 310. Image block 310 is a data representation in the image domain. For example, image block 310 can represent video data. This is convenient for explanation, but not necessary for the invention. Image block 310 can be a representation of other kind of data, such as e.g., audio data. Image block 310 is a matrix {f(i,j)} with $N_i$ rows (i=0 to $N_{i-1}$) and $N_j$ columns (j=0 to $N_{j-1}$) of a plurality of image samples f(i,j), identified by reference number 312. Preferably, image block 310 is a square (e.g., $N_i$=8, $N_j$=8) with a number of N=8*8=64 image samples f(i,j). For convenience of explanation, index pairs (i,j) can be substituted by single index n following the order n=(i,j): 0=(0,0), 1=(0,1), 2=(0,2), ..., 63=(7,7). Matrix {f(i,j)} is thereby written as sample vector {f(n)}. In FIG. 3, n-indices 0, 1, 2, 7, 8, 16, 56, and 63 are shown underscored, as an example.

Figure 4:
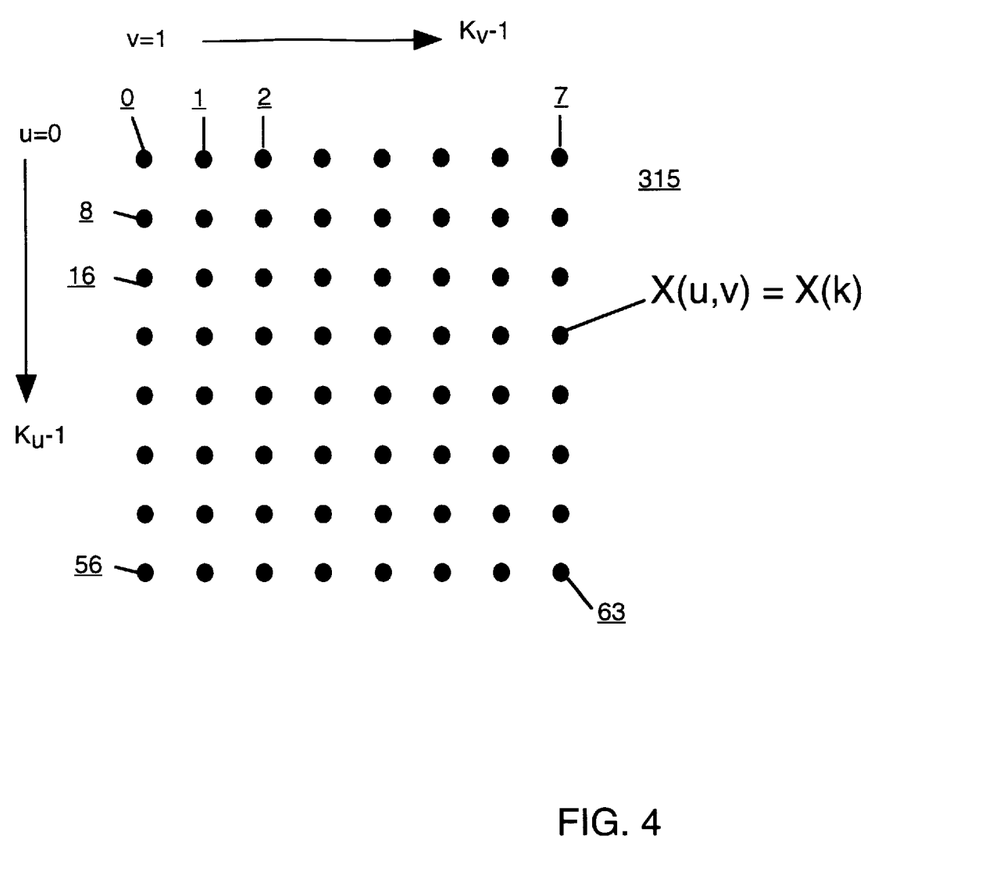
FIG. 4 illustrates a simplified block diagram of a spectral block.

FIG. 4 illustrates a simplified block diagram of spectral block 315. Spectral block 315 is a representation of data in the spectral domain after transformation by a transformation function. Image block 315 is a matrix {X(u,v)} of transformation amplitudes X(u,v) in $K_u$ rows (u=0 to $K_u$-1) and $K_v$ (v=0 to $K_v$-1) columns. Representing other transformation functions, Forward Discrete Cosine Transformation (FDCT) is introduced. In FDCT, amplitudes X(u,v) (● symbols) are derived from image samples f(i,j)=f(n) according to $$X(u, v) = 1/4 * c(u) * c(v) * \qquad (9)$$
$$\sum_{i=0}^{K_i-1} \sum_{j=0}^{K_j-1} f(i, j) * \cos(\pi * u * (2*i+1)/(2*K_{i-1})) *$$
$$\cos(\pi * v * (2*j+1)/(2*K_{j-1}))$$

with "π=3.1415 ..." as a constant known in the art and "cos" for cosine function.
Auxiliary coefficients are:

$c(u), c(v)=(1/2)^{-1/2}$ for u,v=0 or, otherwise (10)

$c(u),c(v)=1$ (11)

By defining cosine coefficients $A(u,i)=(1/2)*c(u)* \cos(\pi*u*(2*i+1)/2*K_{i-1}))$ (12)

$B(v,j)=(1/2)*c(v)* \cos(\pi*v*(2*j+1)/(2*K_{j-1}))$ (13)

$C(u,v,i,j)=A(u,i)*B(v,j)$, (14)

equation (9) is expressed as:

$$X(u, v) = \sum_{i=0}^{K_i-1} \sum_{j=0}^{K_j-1} f(i, j) * A(u, i) * B(v, j). \qquad (15)$$

or $$X(u, v) = \sum_{i=0}^{K_i-1} \sum_{j=0}^{K_j-1} f(i, j) * C(i, j, u, v). \qquad (16)$$

Equations (15) and (16) are sums each having $N=K_i*K_j$ (e.g., N=64) variable image samples f(i,j) and constant coefficients C(i,j,u,v):

$X(u,v)=f(0,0)*C(0,0,u,v)+f(0,1)*C(0,1,u,v)+ \ldots +$
$f(7,7)*C(7,7,u,v)$ (17)

Index pairs (i,j) and (u,v) in equations (15) and (16) are substituted by indices n (n=0 to N-1) and k (k=0 to K-1), respectively:

$$X(k) = \sum_{n=0}^{N-1} f(n) * C(n, k) \qquad (18)$$

$X(k)=f(0)*C(0,k)+f(1)*C(1,k)+ \ldots +f(n)*C(n,k)+ \ldots +f(N-1)*C(N-1,k)$ (19)

Index pairs (u,v) are substituted by index k following the order k=(u,v): 0=(0,0), 1=(0,1), 2=(0,2), ..., 63=(7,7). In FIG. 4, indices k (e.g., for k=0, 1, 2, 7, 8, 16, 56, and 63) are indicated by underscored numbers. X(0) is called a DC-amplitude in analogy to the well known term "Direct Current".

Amplitudes X(k) form a K-element amplitude vector {X(k)} for k=0 to K-1:

$\{X(k)\}=|X(0), X(1), X(2), \ldots X(k), X(K-1)|$. (20)

Coefficients C(n,k) form coefficient matrix {C(n,k)}:

$$\begin{vmatrix} C(0, 0) & C(0, 1) & C(0, 2) & \ldots & C(0, k) & C(0, K-1) \\ C(1, 0) & C(1, 1) & C(1, 2) & \ldots & C(1, k) & C(1, K-1) \\ & & & \ldots & & \\ C(n, 0) & C(n, 1) & C(n, 2) & \ldots & C(n, k) & C(n, K-1) \\ C(N-1, 0) & C(N-1, 1) & C(N-1, 2) & \ldots & C(N-1, k) & C(N-1, K-1) \end{vmatrix} \qquad (21)$$

Coefficient matrix $\{C(n,k)\}$ can be considered as a vector with index-k-elements which are the columns of $\{C(n,k)\}$ (for n=1 to N-1):

$$\{C(n,k)\}=|\{C(n,0)\}\ \{C(n,1)\}\ \{C(n,2)\}\ \ldots \ \{C(n,k)\}\ \{C(n,K-1)\}| \qquad (22)$$

Equation (18) is conveniently expressed as a matrix multiplication of sample vector $\{f(n)\}$ with coefficient matrix $\{C(n,k)\}$:

$$\{X(k)\}=\{f(n)\}*\{C(n,k)\} \qquad (23)$$

System 400 can calculate equation (18) for a single index k by a number of N (e.g., 64) multiplications which can successively be performed in a single CU k. Thereby, f(n) are loaded successively into REG k, while a number of N coefficients C(n,k) is stored in MEM k. CU k receives f(n) from REG k and C(n,k) and ACCU k sums up ($\Sigma$) intermediate results f(n) * C(n,k) to X(k). To evaluate equations (18) or (23) for all indices K, a number of N*K, for example, 64*64=4096 calculations involving f(n) is required. System 400 X(k) for all k in parallel using its plurality of MEM k, REG k, CU k, and ACCU k. In other words, system 400 uses its calculators 450-k (e.g., k=1 to K) and its register array $\{REG\}$ and memory array $\{MEM\}$ to perform a vector-with-matrix multiplication.

Figure 5:
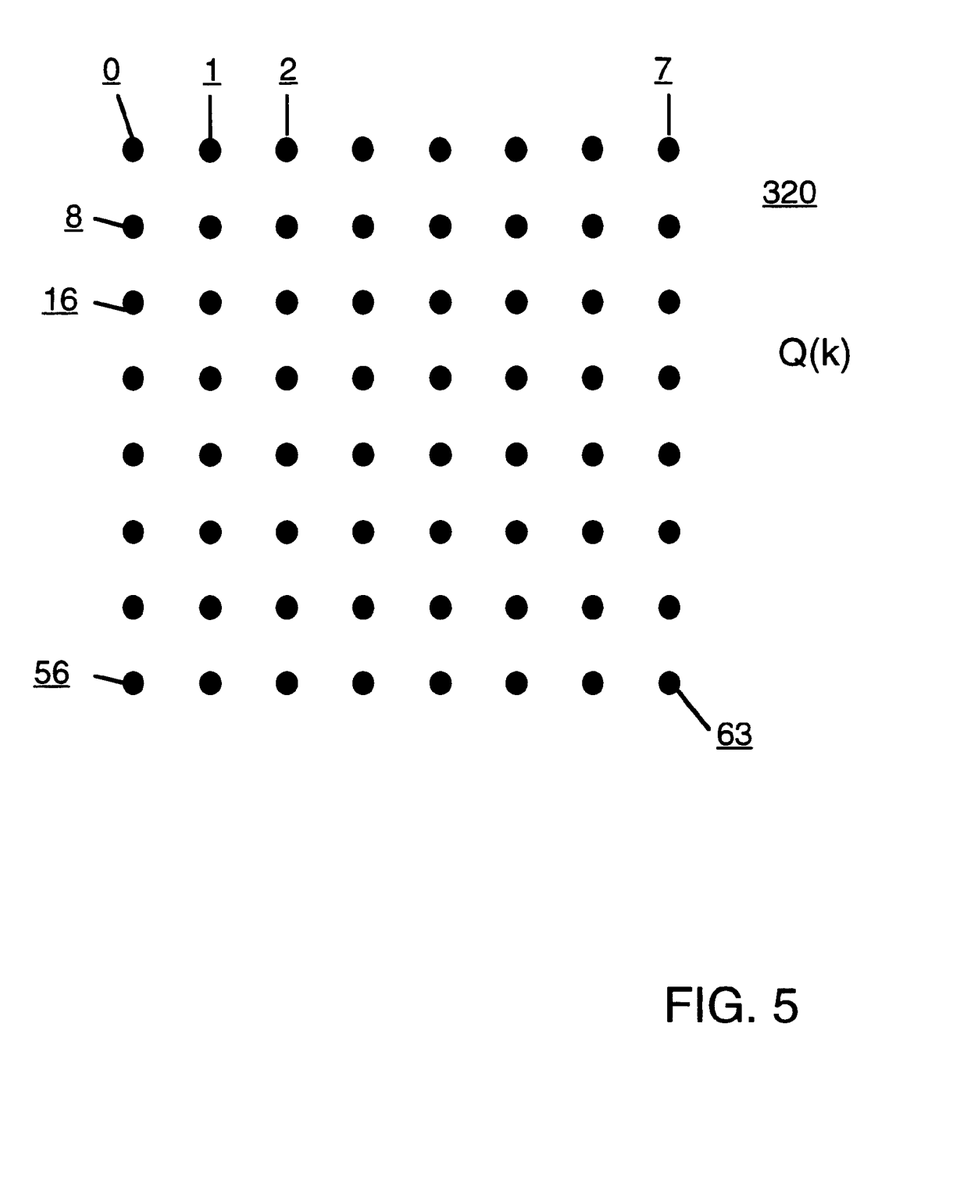
FIG. 5 illustrates a simplified block diagram of a quantizer table comprising quantizers.

Having described transforming, FIGS. 5–6 illustrate—among other things—quantizing prior or simultaneously with transforming. FIG. 5 illustrates a simplified block diagram of quantizer table 320 comprising k=0 to K quantizers Q(k) (● symbols). Quantizers Q(k) are preferably, integer values between 1 and 255. K is, preferably, K=64. Representative indices k=0, 1, 2, 7, 8, 16, 56, and 63 are given underscored. Quantizers Q(k) form a quantizer vector:

$$\{Q(k)\}=|Q(0),Q(1),Q(2),\ldots Q(k),Q(K-1)| \qquad (24)$$

FIG. 6 illustrates a simplified block diagram of quantized spectral block 325 of quantized amplitudes $X^Q(k)$ (● symbols and ø symbols). Indices k are given underscored. Quantized amplitudes $X^Q(k)$ are obtained by dividing amplitudes X(k) by quantizers Q(k):

$$X^Q(k)=(X(k)/Q(k)) \qquad (25)$$

with the slash "/" for division. Preferably, X(k) and Q(k) are represented by integer numbers. In such cases, the result of the division is converted to the nearest integer value, e.g., 4.5 to 4, 4.2 to 4, 4.8 to 5, etc. This conversion is conveniently expressed as:

$$X^Q(k)=\text{IntegerRound }(X(k)/Q(k)) \qquad (26)$$

A person of skill in the art is able to implement 'Integer-Round' by apparatus well known in the art. A division by Q(k) can also be considered as a multiplication with an inverse quantizers "1/Q(k)".

In other words, in a quantizing operation, each element of vector $\{X(k)\}$ is related to that element of quantizer vector $\{Q(k)\}$ having the same index k:
The result is a quantized amplitude vector $\{X^Q(k)\}$:

$$\{X^Q(k)\}=|X(0)/Q(0),X(1)/Q(1),\ldots X(k)/Q(k), X(K-1)/Q(K-1)| \qquad (27)$$

Calculation of $X^Q(k)$ of equation (25) can be performed more easily as explained below. Quantizers Q(k) are introduced on the right side of the $\Sigma$-$\Sigma$-symbol in equations (9), (15), (16) and (18). For example, in equation (18), coefficients C(n,k) are divided by Q(k):

$$X^Q(k) = X(k)/Q(k) = \sum_{n=0}^{N-1} f(n)*(C(n,k)/Q(k)) \qquad (28)$$

With the abbreviation $C^Q(n,k) = C(n,k)/Q(k)$ equation (27) is simplified to:

$$X^Q(k) = \sum_{n=0}^{N-1} f(n)*C^Q(n,k) \qquad (29)$$

The vector representation gives a quantized amplitude vector:

$$\{X^Q(k)\}=|X^Q(0),X^Q(k),\ldots,X^Q(K-1)| \qquad (30a)$$

where:

$$X^Q(0)=\Sigma(f(n)*C^Q(n,0)), \qquad (30b)$$

$$X^Q(k)=\Sigma(f(n)*C^Q(n,k)), \text{ and} \qquad (30c)$$

$$X^Q(K-1)=\Sigma(f(n)*C^Q(n,K-1)) \qquad (30d)$$

Having described quantizing, in connection with FIGS. 5–6, zigzagging is now explained in connection with FIG. 6. As illustrated in FIG. 6, zigzag path 328 goes, preferably, horizontally, vertically and diagonally from $X^Q(0)$ to $X^Q(63)$. Zigzag path 328 arranges quantized amplitudes $X^Q(k)$ in a zigzag order. It is intended in FIG. 6 to show zigzag path 328 only as a preferred example for a predefined order. The particular shape or arrangement of zigzag path 328 is not essential for the invention. A person of skill in the art is able, based on the description herein, to practice the present invention for any other paths giving any other order. For convenience of explanation, the zigzag order of path 328 is also illustrated by small Arabic subscripts (0, 1, 2, ... 63, right below) for "position p" (p=0 to P-1) at the (● and ø symbols) for $X^Q(k)$. Keeping the original indices k unchanged and indicating the new order by these position-subscripts p, quantized amplitude vector $\{X^Q(k)\}$ is written as quantized amplitude vector $\{X^Q(k)\}^Z$ in zigzag order (see superscript "Z" of equation 6):

$$\{X^Q(k)\}^Z = |X^Q(0)_0, X^Q(1)_1, X^Q(8)_2, X^Q(16)_3, \\ X^Q(9)_4, X^Q(2)_5, X^Q(3)_6, \ldots X^Q(k)_p, \ldots X^Q(63)_{P-1}| \qquad (31)$$

Preferably, the first element (k=0) goes to the first position (p=0) and the last element (k=K-1) goes to the last position (p=P-1, e.g., P=64). To use of quantized amplitude vector $\{X^Q(k)\}$ is convenient of explanation, zigzagging applies also to $\{X(k)\}$ in which the amplitudes have not to be quantized. The re-arrangement of indices ("zigzagging") can be expressed by table I. Tables I relates indices k of e.g., the elements $C^Q(n,k)$ of coefficient matrix $\{C^Q(n,k)\}$ to position index p. Preferably, the relations between vector index k and position index p are standardized. As mentioned above, a person in the art is able provide other relations for example, by drawing zigzag path 328 otherwise, if this is required.

TABLE I

Example of the relation between vector index k and position index p

| k | 0  | 1  | 2  | 3  | 4  | 5  | 6  | 7  | 8  | 9  | 10 | 11 | 12 | 13 | 14 | 15 |
|---|----|----|----|----|----|----|----|----|----|----|----|----|----|----|----|----|
| p | 0  | 1  | 5  | 6  | 14 | 15 | 27 | 28 | 2  | 4  | 7  | 13 | 16 | 26 | 29 | 42 |
| k | 16 | 17 | 18 | 19 | 20 | 21 | 22 | 23 | 24 | 25 | 26 | 27 | 28 | 29 | 30 | 31 |
| p | 3  | 8  | 12 | 17 | 25 | 30 | 41 | 43 | 9  | 11 | 18 | 24 | 31 | 40 | 44 | 53 |
| k | 32 | 33 | 34 | 35 | 36 | 37 | 38 | 39 | 40 | 41 | 42 | 43 | 44 | 45 | 46 | 47 |
| p | 10 | 19 | 23 | 32 | 39 | 45 | 52 | 54 | 20 | 22 | 33 | 38 | 46 | 51 | 55 | 60 |
| k | 48 | 49 | 50 | 51 | 52 | 53 | 54 | 55 | 56 | 57 | 58 | 59 | 60 | 61 | 62 | 63 |
| p | 21 | 34 | 37 | 47 | 50 | 56 | 59 | 61 | 35 | 36 | 48 | 49 | 57 | 58 | 62 | 63 |

The reader can imagine to multiply vector $\{X^Q(k)\}$ (k=0 to K−1) of quantized amplitudes $X^Q(k)$ with permutation matrix $\{P\}$ having e.g., $K=L_1=L_2$ rows and columns. Permuted vector $\{X^Q(k)\}^Z$ can be obtained by such a multiplication. But this is not required by the present invention.

$$\{P\} = \begin{vmatrix} \begin{matrix} 0 & 1 & 2 & 3 & 4 & 5 & 6 & 7 & p & 63 \\ 1 & 0 & 0 & 0 & 0 & 0 & 0 & 0 & & 0 \end{matrix} & 0 \\ 0\ 1\ 0\ 0\ 0\ 0\ 0\ 0\quad\ 0 & 1 \\ 0\ 0\ 0\ 0\ 0\ 1\ 0\ 0\quad\ 0 & 2 \\ \cdots & \\ 0\ 0\ 1\ 0\ 0\ 0\ 0\ 0\ 0\ 0 & 8 \\ 0\ 0\ 0\ 0\ 0\ 0\ 0\ 1\ 0 & k \\ \cdots & \\ 0\ 0\ 0\ 0\ 0\ 0\ 0\ 0\ 1 & K-1 \end{vmatrix} \quad (32)$$

In the example for permutation matrix $\{P\}$, element $X^Q(k)$ in $\{X^Q(k)\}$ goes to that position in $\{X^Q(k)\}^Z$ in which row $1_1=k$ of $\{P\}$ has a "1" element. It is possible to simplify the zigzagging of $\{X^Q(k)\}$. Preferably, zigzagging is applied not to vector $\{X^Q(k)\}$ when all its elements have been calculated, but is applied to the coefficient matrix $\{C(n,k)\}$ of equation (22). The columns $\{C(n,k)\}$ (for n=1 to N−1) are zigzagged with their indices, resulting in coefficient matrix $\{C(n,k)\}^Z$ in zigzag order $$\{C(n,k)\}^Z = |\{C(n,0)\}_0, \{C(n,1)\}_1, \{C(n,8)\}_2, \qquad (33)$$
$$\{C(n,16)\}_3, \{C(n,9)\}_4, \ldots \{C(n,k)\}_p, \{C(n,K-1)\}_{P-1}|$$

The same approach is applicable for quantized coefficients:

$$\{C^Q(n,k)\}^Z = |\{C^Q(n,0)\}_0, \{C^Q(n,1)\}_1, \{C^Q(n,8)\}_2, \qquad (34)$$
$$\{C^Q(n,16)\}_3, \{C^Q(n,9)\}_4 \ldots \{C^Q(n,k)\}_p, \{C^Q(n,K-1)\}_{P-1}|$$

giving a quantized coefficient matrix $\{C^Q(n,k)\}^Z$ in zigzag order.

Now, it will be explained how system 400 uses matrix $\{C^Q(n,k)\}^Z$. FIG. 7 illustrates example times-slices for memory array 430 {CELL} and register array 435 {REG} of system 400 (FIG. 2). From the left side to the right side, array {CELL} is illustrated with columns MEM 0, MEM 1, MEM 2, MEM 3, MEM 4 . . . to MEM 63. Each MEM k has cells CELL (n,k) (reference 431) with index n incrementing in the top-down direction. This convention with CELL (0,0) at the top left corner and CELL (63,63) at the down right corner of {CELL} is convenient for explanation and not intended to be limiting. During time points t=0 to t=63, {CELL} stores matrix $\{C^Q(n,k)\}^Z$ (quantized coefficient matrix in zigzag order). Thereby, MEM k stores column vector $\{C^Q(n,k)\}_p$ with position p (with k=p). For example, MEM 0 stores $\{C^Q(n,0)\}_0$, MEM 1 stores $\{C^Q(n,1)\}$, MEM 2 stores $\{C^Q(n,8)\}_2$, MEM 3 stores $\{C^Q(n,16)\}_3$, MEM 4 stores $\{C^Q(n,16)\}_4$, and MEM 63 stores $\{C^Q(n,8)\}_{63}$. With such a memory arrangement, {CELL} contains information needed for transforming, quantizing, and zigzagging. Preferably, coefficients $C^Q(n,k)$ of row n of $\{C^Q(n,k)\}^Z$ in one row of {CELL}.

Register array {REG} with REG 0, REG 1, REG 2, REG 3, REG 4 and REG 63 is illustrated for time points $t_0$, $t_1$, $t_2$, and $t_{63}$. In general, at time $t_n$, all REG k of {REG} store one sample f(n), such as, for example, all REG k of {REG} store f(0) at time point $t_0$, all REG k store f(1) at $t_1$, all REG k store f(2) at time $t_2$, and so forth until all REG k store f(N−1)=f (63) at time point t(N−1)=t63. Preferably, time points $t_n$ (for n=0 to N−1) are consecutive time points, but this is not essential for the present invention. Dashed lines 434-$t_n$ illustrate that coefficient $C^Q(n,k)$ stored in row n of {CELL} are related to f(n). For example, during time point $t_0$, all CU k (k=0 to K−1) relate coefficients $C^Q(0,k)$ (first row in {CELL} ) to f(0), thus providing intermediate results $C^Q(0,k)*f(0)$ (equation 29, right of Σ) to ACCU k (k=0 to (K−1)). During time point $t_1$, all CU k relate coefficients $C^Q(1,k)$ (second row in {CELL} ) to f(1), thus providing intermediate results $C^Q(1,k)*f(0)$. Similarly, this is repeated until time point $t=t_{(N-1)}=t_{63}$ when all CU k relate coefficients $C^Q(63,k)$ (last row) to f(N−1)=f(63), thus providing $C^Q(63, k)*f(63)$. During a cycle of time points to $t_0$ $t_{(N-1)}$, ACCU k implements the Σ-sign of equation (18), so that at the end of the cycle, the quantized amplitude vector $\{X^Q(k)\}^Z$ in zigzag order of equation (31) is available at ACCU k (k=0 to K−1). The index k of ACCU k corresponds thereby to above mentioned position p.

Having described transforming, quantizing and zigzagging, rate controlling and run-length coding is now explained in connection with FIGS. 6 and 8. Preferably, some $X^Q(k)$ of quantized spectral block 325 of FIG. 6 have a value $\|X^Q(k)\|<\|X^{QT}\|$ with $\|X^{QT}\|$ being a threshold value. The $\|$ symbol stands for absolute values. For convenience, such $\|X^Q(k)\|<\|X^{QT}\|$ are hereinafter called zero-amplitudes $X^Q(k)$. In FIG. 6, zero-amplitudes $X^Q(k)$ are, for example, $X^Q(9)_4$, $X^Q(11)_{13}$, $X^Q(18)_{12}$, and $X^Q(25)_{11}$ (ø symbols with reference numbers 326, 327). Accordingly, other quantized amplitudes $X^Q(k)$ with $\|X^Q(k)\|\geq\|X^{QT}\|$ are called non-zero amplitudes and illustrated by ● symbols. The example of FIG. 6 shows zero-amplitudes $X^Q(k)$ (with $|X^Q(k)|<|X^{QT}|$) for consecutive positions p=11, p=12, and p=13 (number 327, ø symbols).

For example, K=64 quantized amplitudes $X^Q(k)$ can be expressed by 64 pairs $[X^Q(k);p]$ having quantized amplitudes $X^Q(k)$ itself and position index p. Some of the pairs are zero-pairs e.g., $[X^Q(9),4]$, $[X^Q(25),11]$, $[X^Q(18),12]$, $[X^Q(11),13]$, and having zero-amplitudes with $|X^Q(k)|<|X^{QT}|$. There is no need to transmit the zero-pairs. During run-length coding, non-zero pairs of non-zero amplitudes and their position are formed and transmitted, wherein zero-amplitudes are not considered. It is not essential for the present invention, whether non-zero pairs are in parallel transmitted by two lines (one line for $X^Q$, one line for position p) or serially transmitted by one line (e.g., alternatively $X^Q$ and p).

FIG. 8 illustrates a simplified block diagram of pair generator 480 as it can be used in system 400 of FIG. 2 for rate controlling and run-length coding. Pair generator 480 as illustrated here is intended to give an example for explanation and is not limited to the example. Pair generator 480 comprises comparator 490, multiplexer 485, and cyclic counter 486.

Input line 437 originating from buffer 470 (see FIG. 2, providing $X^Q(k)$) at positions p=0 to P−1 is coupled to input 481 of multiplexer 485 and to input 491 of comparator 490. Counter 486 has output line 487 coupled to input 482 of multiplexer 485. Counter cyclically provides indices p from 0 to P−1. Comparator 490 has input 438 for receiving threshold value $\|X^{QT}\|$ (see description of FIG. 6), and output line 439 coupled to enable input 489 of multiplexer 485. Multiplexer 485 has output line 404 (see also FIG. 2) for serially providing non-pairs $[X^Q(k), p]$. A person of skill in the art is able based on the description herein to provide $\|X^QT\|$ at line 438 and to cyclically switch multiplexer 485 between inputs 482 and 481. A particular feature of the present invention is that it makes it possible to provide a variable threshold value $|X^{QT}|$ so that rate-control is achieved.

Numbers 17, 12, 33, 50, 2, 45 above line 437 represent quantized amplitudes $X^Q(k)$ for k=1 to 6. Numbers 0, 1, 2, 3, 4, 5 at line 487 represent position indices p.

Assuming, that $X^Q(k)$ are available in ACCU 0 to ACCU K−1. $X^Q(k)$ are duplicated from ACCU k into stages 471-k of buffer 470. Buffer 470 serially supplies $X^Q(k)$ to input 481 of comparator 490 and multiplexer 485 via line 437. Simultaneously, counter 486 provides indices p beginning with e.g., p=0 input 482 of multiplexer 485. Comparator 490 compares $X^Q(k)$ with $\|X^{QT}\|$ (e.g., $|X^{QT}|$=10) and enables multiplexer 485 at enable input 489 for $$X^Q(k) \geq \|X^{QT}\| \text{ (non-zero amplitudes)} \qquad (35)$$

and disables multiplexer 485 for $$X^Q(k) < \|X^{QT}\| \text{ (zero amplitudes)} \qquad (36)$$

Enabled multiplexer 485 serially supplies pairs $[X^Q(k);p]$ wherein disabled multiplexer 485 does not supply pairs. In other words, zero-amplitudes are discarded. The first four quantized amplitudes 17, 12, 33, 50 are non-zero amplitudes, so that multiplexer 485 supplies 17, 0, 12, 1, 33, 2, 50 and 3 to output line 404. In other words, preferably only non-zero amplitudes are forwarded. Thereby, pairs [17, 0], [12, 1], [33, 2], [50, 3] are formed. The next amplitude $X^Q(4)$=8 is below $|X^{QT}|$=10). Multiplexer 485 is disabled and does not send amplitudes or index k=4 to line 404. With the following amplitude $X^Q(5)$=45, comparator 490 again enables multiplexer 485 so that multiplexer 485 sends 45 and 5 (pair [45, 5]) to line 404.

FIG. 9 illustrates a simplified flow diagram of method 500 according to the present invention. Method 500 illustrates how one image block 310 with sample vector {f(n)} of FIG. 3 as input data ("DATA IN") is encoded to one set of non-zero pairs $[X^Q(k),p]$ (cf. FIG. 8) as output data ("DATA OUT"). Method 500 comprises coefficient matrix loading step 510 (zigzagging and quantizing), transforming step 570 (dashed frame) with cyclically sub-steps 520, 530, and 540), and encoding step 550 for rate-controlling and run-length coding.

Bold line 511 ("COEFFICIENT IN") going to step 510 illustrates that system 400 receives matrix $\{C^Q(n,k)\}^Z$; bold line 521 ("DATA IN") going to step 520 illustrates the reception of f(n); and bold line 551 ("DATA OUT") illustrates the provision of non-zero pairs ("DATA OUT"). Steps 510, 570 and 550 are performed, preferably, in consecutive order. It is assumed that all ACCU k have initially been reset to a value of zero. Arrows between the steps indicate a preferred method flow with the follow steps:

During matrix loading step 510, system 400 writes the quantized coefficient matrix $\{C^Q(n,k)\}^Z$ in zigzag order into {CELL} as described above in connection with FIGS. 6–7. Preferably, system 400 receives $\{C^Q(n,k)\}^Z$ via bus 422. It is also possible to implement {CELL} by a non-volatile memory (e.g., a ROM) which stores $\{C^Q(n,k)\}^Z$ permanently. Other matrices (such as $\{C(n,k)\}^Z$ of equation 33 or $\{C(n,k)\}$ of equations 21, 22) can also be used instead of matrix $\{C^Q(n,k)\}^Z$. The features "Z" for zigzag and "Q" for quantization are not essential.

Transforming step 570 has sample loading step 520, calculating intermediate results step 530, and summing step 540 which are repeated (line 560) in a cycle for time points $t_0$ to $t_{(N-1)}$. In sample loading step 520, substantially all REG k ({REG}) receive one sample f(n), preferably via bus 422 and starting with f(0). Step 520 can also be described by broadcasting one sample f(n) to substantially all REG k. In calculating intermediate results step 530, intermediate results $f(n)*C^Q(n,k)$ are calculated in parallel by substantially all CU k and provided to ACCU k. In summing step 540, intermediate results $f(n)*C^Q(n,k)$ are summed up in parallel by ACCU k. Steps 520, 530, and 540 are repeated for n=0 to N−1 (line 560) so that a number of K−1 quantized amplitudes $X^Q(k)$ in vector $\{X^Q(k)\}^Z$ are provided which are already arranged in a zigzag order.

In encoding step 550, buffer 470 serially supplies amplitudes $X^Q(k)$ to pair generator 480 in which rate controlling and run-length coding is performed as described in connection with FIG. 8. Finally, non-zero pairs $[X^Q(k),p]$ are provided to output line 404.

Method 500 can be repeated for a new sample vector {f(n)}. It is an advantage of the present invention, that matrix loading step 510 is not required. Matrix, such as $\{C^Q(n,k)\}^Z$ can stay in {CELL} as long as system 400 repeats method 500. During repetition, encoding step 550 can be performed with $X^Q(k)$ of "old" samples f(n), while transforming step 570 can be performed for "new" samples f(n).

FIG. 10 illustrates further example time-slices for memory array 430 {CELL} and register array 435 {REG} of system 400 (FIG. 2). Similar as in FIG. 7, {CELL} is illustrated with columns MEM 0, MEM 1, MEM 2, MEM 3, MEM 4, . . . to MEM 63. Reference numbers in FIGS. 7 and 10 denote similar components. Each MEM k has cells CELL (n,k) (reference 431) with index n incrementing in the top-down direction. This convention is with CELL (0,0) at the top left corner and CELL (63,63) at the down right corner of {CELL} is convenient for explanation and not intended to be limiting. During time points t=0 to t=63, {CELL} stores a matrix $\{C^Q(n,k)\}^{ZS}$ which is a quantized coefficient matrix in zigzag order and shifted columns (subscript "S" for "shifted"). As in $\{C^Q(n,k)\}^Z$ of FIG. 7, each column vector $\{C^Q(n,k)\}p$ with position p is stored at MEM k (with k=p). Column vectors in FIGS. 7 and 10 each have the same coefficients $C^Q(n,k)$. However, in the example of FIG. 10, the coefficients $C^Q(n,k)$ are arranged differently. Coefficients $C^Q(n,k)$ for one n are diagonally distributed across {CELL}. The arrangement becomes apparent when the storage of data in register array {REG} is introduced.

Register array {REG} with REG 0, REG 1, REG 2, REG 3, REG 4 and REG 63 is illustrated for time points to, $t_1$, $t_2$, and $t_{63}$. In general, at time $t_n$, {REG k} store on sample vector {f(n)}. For example, at $t_0$, REG 0 stores f(0), REG 1 stores f(1), and so forth to REG (K−1) with f(N−1)=f(63). At time $t_1$, all f(0) to f(63) have been shifted through lines 436-k by one position from REG k to REG (k+1): f(0) is in REG 1, f(1) in REG 2, and so forth to f(62) in REG 63 and f(63) in REG 0. During a cycle from $t_0$ to $t_{63}$, all f(n) are shifted through register ring 436' (FIG. 2). In the example, shifting takes place in a clockwise sense from REG k to REK (k+1) with the turn-around-wrap at REG (K−1). It is convenient to imagine diagonal lines connecting f(n) having equal n. Such a f(n)-line goes here in a "right up" direction and is indicated by boldfaced f(0). (f(0) in REG 0 at $t_0$, in REG 1 at $t_1$, REG 2 at $t_2$, etc.) The shift direction is not essential. A person of skill in the art is able, based on the description herein to organize the shift in a different way, even loading f(0) to f(N−1) initially (e.g., time point to) not to REG 0 to (K−1). The loading of f(n) into {REG} in FIG. 10 is different to the scheme of FIG. 7 where at one time $t_n$, all REG k store the same sample f(n).

Dashed lines 434-$t_n$ illustrate that the coefficient $C^Q$ stored in row n of {CELL} is related to that f(n) which is loaded in the corresponding REG k. The coefficients of matrix $\{C^Q(n,k)\}^{ZS}$ are stored in {CELL} in such a way that coefficient $C^Q(n,k)$ is related to f(n) at the appropriate time point. Inside the columns of {CELL}, coefficients $C^Q(n,k)$ having equal n are arranged diagonally. For example, a $C^Q(0,k)$-line (boldface) would go in the "right down" direction.

It should be mentioned, that the diagonal arrangement of coefficients in {CELL} is not limited to matrices in a zigzag order ("Z") or to matrices with quantized coefficients ("Q"). This feature is independent.

Figure 11:
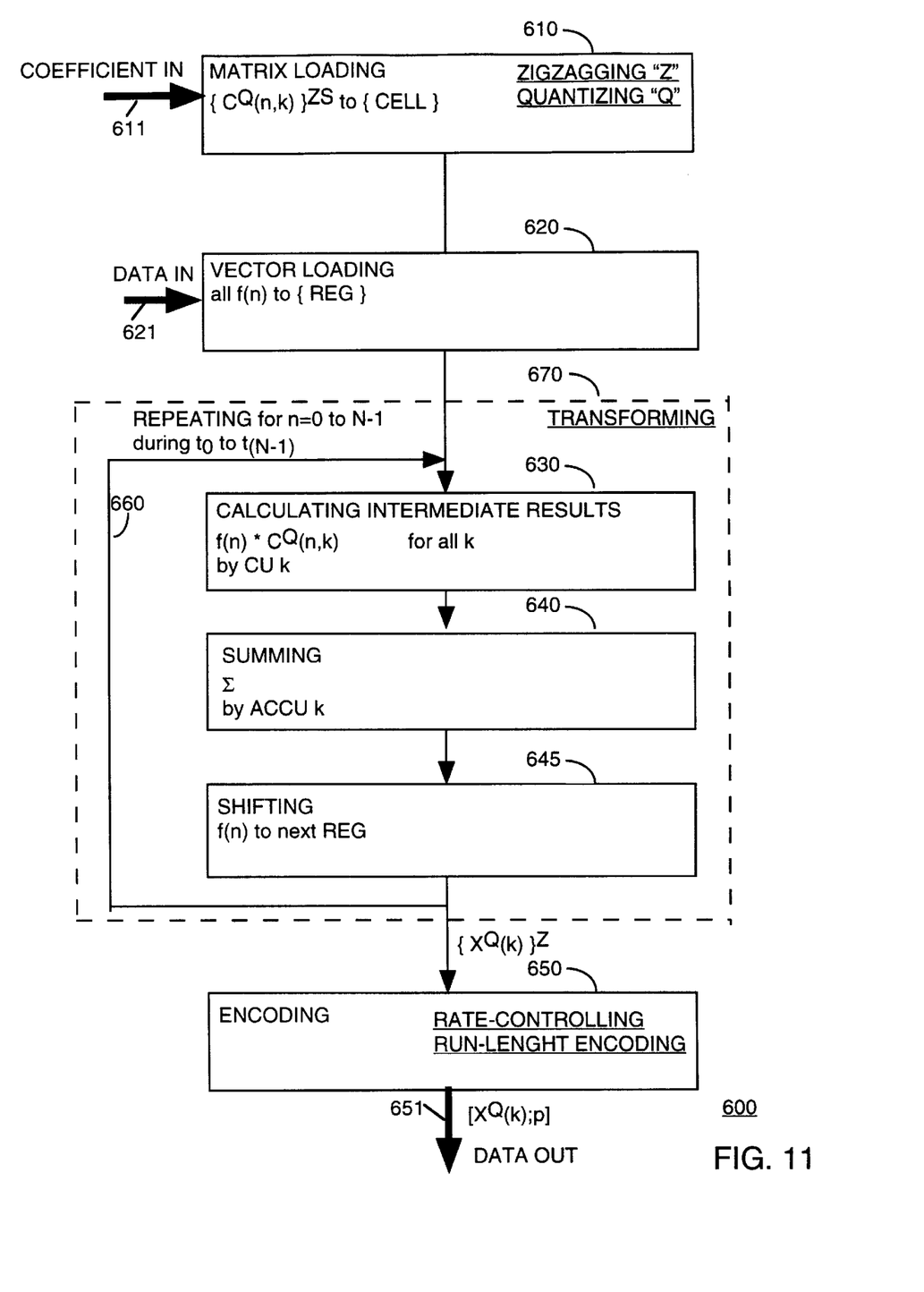
FIG. 11 illustrates a simplified flow diagram of a further method according to the present invention.

When such a matrix $\{C^Q(n,k)\}^{ZS}$ as described in FIG. 10 is used, than system 400 performs a further method. FIG. 11 illustrates a simplified flow diagram of method 600 according to the present invention.

Similarly to method 500 (FIG. 9), method 600 illustrates how image block 310 with sample vector {f(n)} of FIG. 3 as input data ("DATA IN") is encoded to one set of non-zero-pairs [$X^Q(k)$,p] as output data ("DATA OUT"). For simplicity, some details which have been explained in method 500 are not explained again. Method 600 comprises matrix loading step 610, vector loading step 620, transforming step 670 (dashed frame) with cyclically sub-steps 630, 640 and 645) and encoding step 650.

Bold line 611 ("COEFFICIENT IN") going to step 610 illustrates that system 400 receives matrix $\{C^Q(n,k)\}^{ZS}$ (see FIG. 10); bold line 621 ("DATA IN") going to step 620 illustrates the reception of the vector {f(n)}; and bold line 651 ("DATA OUT") illustrates the provision of non-zero pairs ("DATA OUT"). Preferably, method 600 has the following steps:

During matrix loading step 610, system 400 writes the quantized coefficient matrix $\{C^Q(n,k)\}^{ZS}$ in zigzag order and shifted columns into {CELL} as described above in connection with FIG. 10.

During vector loading step 620, system 400 receives substantially all sample f(n) of vector {f(n)} and stores them in {REG}. Step 620 is thereby different to step 520 in method 500.

Transforming step 670 has calculating intermediate results step 630, summing step 640, and shifting step which are repeated (line 660) in a cycle for time points to $t_0$ to $t_{(N-1)}$. In calculating intermediate results step 630, intermediate results f(n)*$C^Q(n,k)$ are calculated in parallel. Summing step 640 takes advantage of the associative law of addition. Intermediate results f(n)*$C^Q(n,k)$ are summed up in a different order than in step 540 of method 500. In shifting step 645, vector {f(n)} is turn-around shifted within {REG} as described above (FIG. 10). Steps 620, 630, 640 and 545 are repeated for n=0 to N−1 (line 660).

In encoding step 650, system 400 operates as in step 550 and provides non-zero pairs [$X^Q(k)$,p] to output line 404.

Although different, methods 500 and 600 use the same input data and proved the same output data. In method 600, "DATA IN"-line 621 is located outside repetition line 660, wherein in method 500, "DATA IN"-line 521 is part of the cycle. Operating according to method 600, system 400 is receiving data only once per cycle. System 400 can use this feature when the timing of loading step 520 becomes critical. In other words, system 400 can operate in a sample loading mode (first mode, method 500) or can operate in a vector loading mode (second mode, method 600).

Encoding is not limited to video applications. The term "image" is used for simplicity and not limited to pictures. A person of skill in the art is able to apply the system and method of the present invention also to other information, such as e.g., to audio or control information or other data. The term "sample" as used in the claims does therefore include picture samples, data samples and other digital representations of input information.

While specific embodiments of the present invention have been shown and described, it will be apparent to those skilled in the art that the disclosed invention may be modified in numerous ways and may assume many embodiments other than the preferred form specifically set out and described above. For instance, an embodiment of the computer processor as herein described can have any number of stages or processing elements, yet still embody the scope of the present invention. Accordingly, it is intended by the appended claims to cover all modifications of the invention which fall within the true spirit and scope of the invention.

We claim:

1. A method for encoding samples to amplitudes, said method comprising the following steps:
   (a) providing coefficients in a coefficient matrix which has columns arranged in a predetermined order;
   (b) providing samples of a first vector; and
   (c) multiplying said first vector with said coefficient matrix by
      (i) multiplying one of said coefficients and one of said samples in each of a plurality of processing units to obtain therefrom a plurality of first intermediate products;
      (ii) repeating said step (i) for another of said coefficients and the same or another of said samples to further intermediate products;
      (iii) for each repetition, summing up said first and further intermediate products in a plurality of accumulator units to obtain amplitudes in a second vector arranged in said predetermined order.

2. The method of claim 1 wherein said coefficients are pre-calculated and comprise quantizers.

3. The method of claim 1 wherein said coefficients are cosine coefficients.

4. The method of claim 1 further comprising a step of length encoding wherein these of said amplitudes which are non-zero are associated with indices to pairs of amplitudes and indices, said indices indicating the position of said non-zero amplitudes in said second vector.

5. The method of claim 1 wherein a number K of columns in said coefficient matrix is equal to a magnitude K of said plurality of processing units equals and equal to a magnitude K of said plurality of accumulator units.

6. The method of claim 1 wherein said step (a) of providing coefficients is performed once and said steps (b) of providing samples and (c) multiplying are performed cyclically.

7. The method of claim 1 wherein said coefficient matrix has 64*64 coefficients.

8. A method for video encoding a sample vector into a amplitude vector having the steps of transforming and zigzagging, said method characterized in that said step of zigzagging is performed by providing a coefficient matrix having elements in columns calculated according to a zigzag scheme prior to said step of transforming and wherein in said step of transforming said sample vector is multiplied with said coefficient matrix to form said amplitude vector.

9. The method for video encoding of claim 8 further comprising a step of run-length coding wherein non-zero coefficients of said coefficient vector are combined with indices to pairs and wherein zero-coefficients of said coefficient vector are discarded.

10. The method for video encoding of claim 8 further comprising a step of run-length coding in which each amplitude of said amplitude vector is sequentially compared to a variable threshold value, amplitudes having a value larger or equal than said threshold value are being forwarded and amplitudes having a value smaller than said threshold value are being discarded.

11. A system for encoding samples, said system comprising:
   a memory array for storing a coefficient matrix of N*K coefficients;
   a register array for receiving and storing a sample vector of N samples;
   a plurality of N calculators for multiplying said coefficient matrix with said sample vector to an amplitude vector of amplitudes in a cycle;
   wherein said coefficients in said memory array are precalculated and arranged within said memory array in a such an order that said amplitudes of said amplitude vector are arranged in a predefined order.

12. The system of claim 11 wherein said predefined order is a zigzag order.

13. The system of claim 11 wherein said coefficients are quantized coefficients so that said amplitude vector is quantized.

14. The system of claim 11 wherein said coefficients define a Forward Discrete Cosine Transformation of said samples to amplitudes.

15. The system of claim 11 wherein said memory array is a non-volatile memory which stores said coefficients permanently.

16. The system of claim 11 wherein said memory array has K columns, each column storing a column vector of said coefficient matrix.

17. The system of claim 11 wherein said register array has K registers, said system being coupled to a bus and receiving one sample at one time during said cycle which is broadcasting to all K registers.

18. The system of claim 11,
   wherein said register array has at least N registers, said registers forming a register ring, each register receiving one sample of said N samples at the beginning of said cycle;
   wherein said coefficients being arranged diagonally within said memory array; and
   wherein said samples are being shifted during said cycle through said register ring and multiplied by the coefficients which are corresponding.

19. The system of claim 11 wherein said coefficient matrix (referred to as $\{C^Q(n,k)\}^Z$) has been precalulated in any order by the following steps:
   providing coefficients $C(n,k)$ according to a transformation function;
   quantizing said coefficients $C(n,k)$ with quantizers $Q(k)$ (superscript Q); and
   multiplying C with a permutation matrix $\{P\}$ (superscript Z).

20. The system of claim 11 wherein N=K.

21. The system of claim 11 further comprising a pair generator which serially receives said amplitudes of said amplitude vector, referenced as $$\{X^Q(k)\}^Z = |X^Q(0)_0, X^Q(1)_1, \ldots X^Q(k)_p, \ldots X^Q(63)_{P-1}|$$

index k being an index of said coefficient matrix, and
   index p being an index for said predefined order,
   wherein said pair generator has
      a cyclical counter for p=0 to P−1,
      a comparator comparing $X^Q(k)_p$ to a threshold value $\|X^{QT}\|$ and
      a multiplexer sending alternatively p and $X^Q(k)_p$ to a single output line, and
   wherein said comparator enables said multiplexer for $X^Q(k) \geq \|X^{QT}\|$ and otherwise disables said multiplexer so that pairs of non-zero amplitudes $X^Q(k)p$ and p-indices are provided.

22. The system of claim 20 wherein said pair generator receives said threshold value $\|X^{QT}\|$ at an input and wherein said threshold value $\|X^{QT}\|$ is variable.

* * * * *